United States Patent
Schueler et al.

(10) Patent No.: US 11,865,432 B2
(45) Date of Patent: Jan. 9, 2024

(54) FOAM PIT COVER

(71) Applicant: Flying Squirrel Sports, LLC, Hamilton, MT (US)

(72) Inventors: Luke Schueler, Coeur d'Alene, ID (US); Cody Schueler, Coeur d'Alene, ID (US)

(*) Notice: Subject to any disclaimer, the term of this patent is extended or adjusted under 35 U.S.C. 154(b) by 760 days.

(21) Appl. No.: 17/067,708

(22) Filed: Oct. 11, 2020

(65) Prior Publication Data

US 2022/0032103 A1   Feb. 3, 2022

Related U.S. Application Data

(60) Provisional application No. 63/060,392, filed on Aug. 3, 2020.

(51) Int. Cl.
| | |
|---|---|
| A63B 6/02 | (2006.01) |
| A63C 19/12 | (2006.01) |
| B29L 7/00 | (2006.01) |
| B60J 7/10 | (2006.01) |

(52) U.S. Cl.
CPC .......... *A63C 19/12* (2013.01); *B29L 2007/005* (2013.01); *B60J 7/10* (2013.01)

(58) Field of Classification Search
CPC .................................. A63C 19/12; A63B 6/02
See application file for complete search history.

(56) References Cited

U.S. PATENT DOCUMENTS

| | | | | |
|---|---|---|---|---|
| 2,848,233 A | * | 8/1958 | Wynn | A63C 19/12 135/115 |
| 3,204,259 A | * | 9/1965 | Gordon | A47C 23/00 5/420 |
| 3,369,808 A | * | 2/1968 | Sconce | A63B 6/02 5/420 |
| 3,513,491 A | * | 5/1970 | Gordon | A47C 27/00 5/420 |
| 3,892,402 A | * | 7/1975 | Montour | A63B 6/02 273/DIG. 8 |
| 4,168,061 A | * | 9/1979 | Gordon | A63B 6/02 482/8 |
| 9,168,410 B2 | | 10/2015 | Palumbo et al. | |
| 2005/0130803 A1 | | 6/2005 | Rastegar et al. | |
| 2014/0230154 A1 | | 8/2014 | Palumbo | |
| 2015/0375026 A1 | | 12/2015 | Palumbo et al. | |
| 2019/0269953 A1 | | 9/2019 | Palumbo et al. | |

FOREIGN PATENT DOCUMENTS

DE   1912146 A1 * 10/1969

* cited by examiner

*Primary Examiner* — Adriana Figueroa
(74) *Attorney, Agent, or Firm* — Antoinette M. Tease (57) ABSTRACT

A foam pit cover having a cover sheet with a gator clip along its perimeter, a perimeter skirt, an apron, and a plurality of toggle bungee cords. The perimeter skirt is made of primary and second sheets, the primary sheet being longer than the secondary sheet. The toggle bungee cords are configured to fit within grommets in the secondary sheet of the perimeter skirt and the bottom part of the apron. The top part of the apron is attached to the bottom part of the primary sheet of the perimeter skirt. The cover sheet and apron are made of a PVC-coated polyester material, and the perimeter skirt is made of a breathable, durable fabric. The invention optionally includes a top sheet with customized graphics and corner pieces to further secure the cover sheet to the perimeter skirt.

7 Claims, 8 Drawing Sheets

FOAM PIT COVER

CROSS-REFERENCE TO RELATED APPLICATION

This application claims priority back to U.S. Patent Application No. 63/060,392 filed on Aug. 3, 2020.

BACKGROUND OF THE INVENTION

1. Field of the Invention

The present invention relates generally to the field of trampoline parks, and more particularly, to a hygienic and removable cover for a foam pit.

2. Description of the Related Art

The recreational entertainment and trampoline park industries include attractions that are situated over pits filled with foam cubes. These foam cubes are difficult to disinfect and clean daily. Most attraction foam pits are only cleaned once a month because of how long it takes to complete the cleaning process and the high cost of payroll for the staff to do the cleaning. Until the present invention, the industry had no effective way to disinfect the foam pit cubes in foam pit attractions daily against bacteria and viruses. This lack of hygiene raises concerns among customers and causes loss of revenue for park owners. Although there have been some inventions directed toward improvements to recreational foam pits, no previous invention has offered the unique structural features and functional advantages of the present invention.

U.S. Pat. No. 3,513,491 (Gordon, 1970) discloses an athlete's landing pit with foam-block cushion units in which a "bun" of soft foamed cushioning material at the top of the unit is supported upon intermediate and bottom layers of firm cushioning material. The intermediate and bottom layers of cushioning material are comprised of spaced parallel foam blocks that extend crosswise of one another and are adhesively bonded together at the crossings. The unit is enclosed in a casing with a waterproof base and a top of breathable fabric. The invention was intended to be used as a high jumper's landing pit.

U.S. Pat. No. 4,168,061 (Gordon, 1979) discloses a portable long jump pit for installation in a gymnasium in connection with an elevated runway or outdoors recessed into the ground so that the top surface of the pit is level with the ground. The pit includes a foam cushioning member and a separate fabric cover over the cushioning member. The fabric cover is held in place by elastic cords. The fabric cover is positioned on the cushioning means in a manner that permits it to slide easily with the person (jumper) relative to the cushioning means and thereby protect the jumper from injury.

U.S. Pat. No. 9,168,410 (Palumbo et al., 2015) discloses an apparatus and method for agitating and rearranging a grouping of individual cushioning articles in an enclosed container. The apparatus includes an air-actuated inflatable bladder with inflatable extensions that may be utilized to lift and/or separate the cushioning articles. The point of this invention is to avoid the clumping of the cushioning pieces.

U.S. Patent Application Pub. No. 20050130803 (Rasteger et al.) describes an apparatus for protecting an individual from an unintended fall. The apparatus is intended to be used as a landing pit underneath the parallel bars, high bars or rings in gymnastics. The invention is a pit filled with foam cubes over which extends a retractable cover. The retractable cover can be flexible or semi-rigid. The system includes a sensor that is mounted on the gymnast and sends a signal to an actuation mechanism to retract the retractable cover when the sensor detects a probability for the occurrence of a fall or dangerous landing.

BRIEF SUMMARY OF THE INVENTION

The present invention is a foam pit cover comprising: a cover sheet having a perimeter, the cover sheet comprising a gator clip along the perimeter of the cover sheet, the gator clip comprising two opposing strips of hook-and-loop fastener being joined at a hinge to form a jaw-like opening; a perimeter skirt, the perimeter skirt comprising a primary sheet and a secondary sheet; wherein the primary sheet and the secondary sheet are both comprised of a breathable, durable material; wherein a top edge of the primary sheet is joined to a top edge of the secondary sheet; wherein a bottom edge of the primary sheet comprises a strip of hook-and-loop fastener along a perimeter of the bottom edge of the primary sheet; wherein a bottom part of the secondary sheet comprises a first plurality of grommets configured to receive first ends of a plurality of toggle bungee cords; wherein the primary sheet has a height measured from the top edge of the primary sheet to the bottom edge of the primary sheet, the secondary sheet has a height measured from the top edge of the secondary sheet to a bottom edge of the secondary sheet, and wherein the height of the primary sheet is greater than the height of the secondary sheet; and wherein a top part of the perimeter skirt comprises a strip of hook-and-loop fastener with a zipper disposed within the strip of hook-and-loop fastener; an apron having a top part and a bottom part, the top part of the apron comprising a gator clip, the gator clip comprising two opposing strips of hook-and-loop fastener being joined at a hinge to form a jaw-like opening and configured to receive the strip of hook-and-loop fastener along the perimeter of the bottom edge of the primary sheet of the perimeter skirt; wherein the bottom part of the apron comprises a second plurality of grommet holes configured to receive second ends of the plurality of toggle bungee cords; and a plurality of toggle bungee cords.

In a preferred embodiment, the invention further comprises a top sheet having a perimeter, the perimeter of the top sheet comprising a strip of hook-and-loop fastener along an underside of the perimeter of the top sheet; wherein the cover sheet further comprises a strip of hook-and-loop fastener along a top side of the gator clip on the perimeter of the cover sheet; and wherein the top sheet and cover sheet are of equal size. Preferably, the cover sheet and the apron are comprised of polyester fabric with a polyvinyl chloride coating. The primary sheet and the secondary sheet of the perimeter skirt are preferably comprised of a woven polypropylene material that is loaded with carbon.

In a preferred embodiment, the invention further comprises one or more corner pieces, each corner piece being tapered so that a bottom end of the corner piece is larger than a top end of the corner piece; wherein each corner piece comprises a perimeter; wherein each corner piece comprises a strip of hook-and-loop fastener along a front surface of the perimeter of the corner piece; and wherein each corner piece comprises a section of hook-and-loop fastener on a top part of a rear surface of the corner piece. Preferably, the invention further comprises a plurality of screws and fender washers for attachment of the bottom part of the apron to a wall of a foam pit.

In an alternate embodiment, the present invention is a foam pit cover comprising: a cover sheet having a perimeter, the cover sheet comprising a gator clip along the perimeter of the cover sheet, the gator clip comprising two opposing strips of hook-and-loop fastener being joined at a hinge to form a jaw-like opening; a perimeter skirt, the perimeter skirt comprising a primary sheet and a secondary sheet; wherein the primary sheet and the secondary sheet are both comprised of a breathable, durable material; wherein a top edge of the primary sheet is joined to a top edge of the secondary sheet; wherein a bottom part of the secondary sheet comprises a first plurality of grommets configured to receive first ends of a plurality of toggle bungee cords; wherein the primary sheet has a height measured from the top edge of the primary sheet to the bottom edge of the primary sheet, the secondary sheet has a height measured from the top edge of the secondary sheet to a bottom edge of the secondary sheet, and wherein the height of the primary sheet is greater than the height of the secondary sheet; and wherein a top part of the perimeter skirt comprises a strip of hook-and-loop fastener with a zipper disposed within the strip of hook-and-loop fastener; an apron having a top part and a bottom part; wherein a bottom edge of the primary sheet of the perimeter skirt is sewn to the top part of the apron; wherein the bottom part of the apron comprises a second plurality of grommet holes configured to receive second ends of the plurality of toggle bungee cords; and a plurality of toggle bungee cords.

REFERENCE NUMBERS

1 Top sheet
1a Hook fastener
2 Cover sheet
2a Loop fastener
2b Gator clip
2c Hook fastener
3 Apron
3a Bottom part (of apron)
3b Grommets
3c Top part (of apron)
3d Gator clip
4 Toggle bungee cords
5 Perimeter skirt
5a Primary sheet (of perimeter skirt)
5b Secondary sheet (of perimeter skirt)
5c Grommets
5d Loop fastener
5e Zipper
5f Loop fastener
5g Loop fastener
6 Corner piece
7 Screw
8 Fender washer

DETAILED DESCRIPTION OF INVENTION

Figure 1:
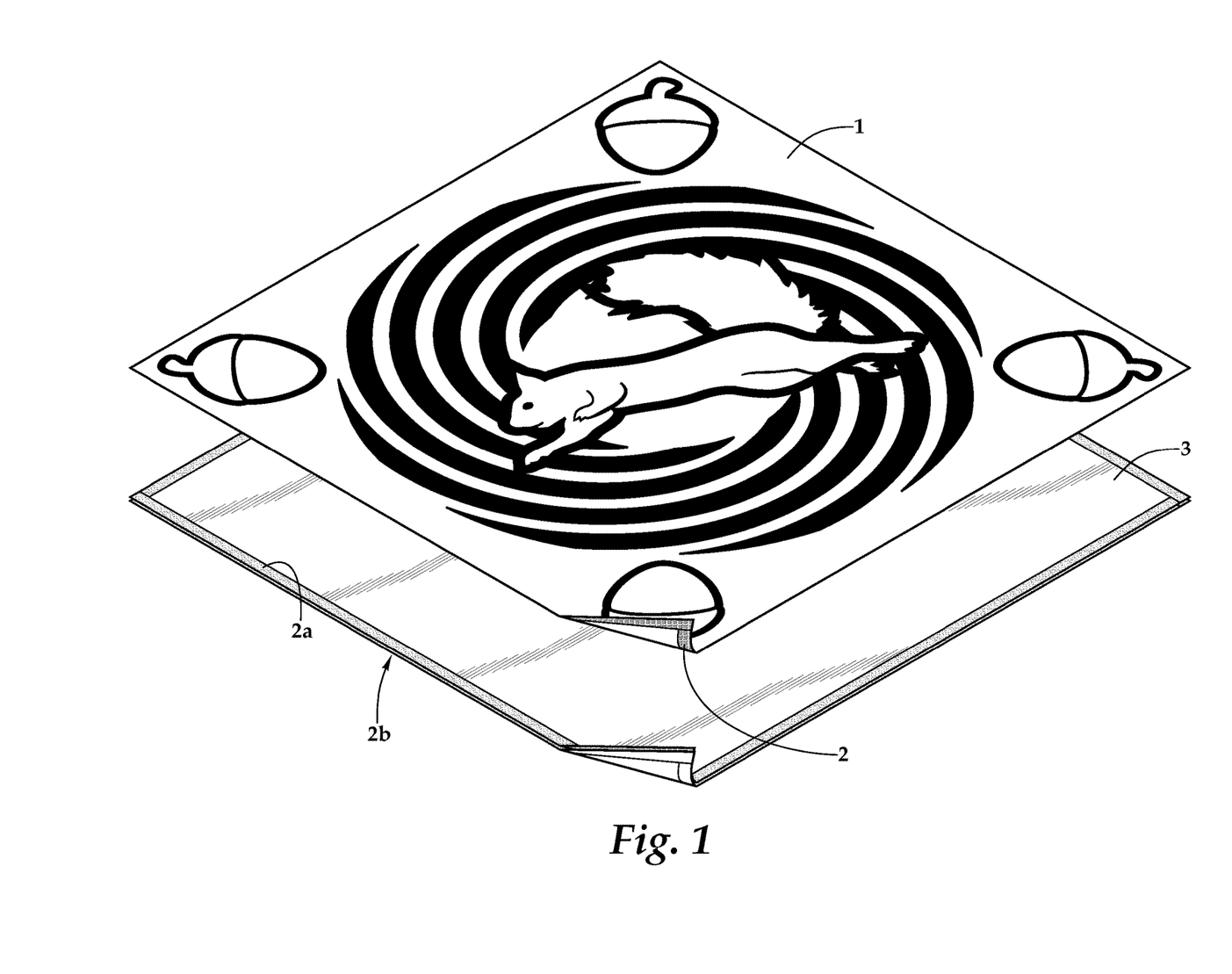
FIG. 1 is a perspective view of the top sheet and cover sheet of the present invention.

FIG. 1 is a perspective view of the top sheet and cover sheet of the present invention. As shown in this figure, the present invention comprises a top sheet 1 and a cover sheet 2, both of which are preferably the same size and configured to approximate the inner diameter of a foam pit. A strip of hook fastener 1a extends around the perimeter of the bottom surface of the top sheet 1. The top sheet is preferably made of a breathable and washable fabric and preferably displays graphics, as shown.

The cover sheet is preferably made of polyester fabric with polyvinyl chloride (PVC) coating and comprises a strip of loop fastener 2a around the perimeter of the top surface of the cover sheet. This strip of loop fastener 2a is configured to mate with the strip of hook fastener 1a on the top sheet 1 to form a hook-and-loop fastener. The cover sheet 2 also comprises a gator clip 2b made up of two strips of hook fastener 2c, which face each other to form the gator clip (see FIG. 7). The gator clip 2b is situated along the perimeter of the cover sheet 2, directly underneath the strip of loop fastener 2a. The strip of loop fastener 2a and the gator clip 2b are preferably of the same width.

Figure 2:
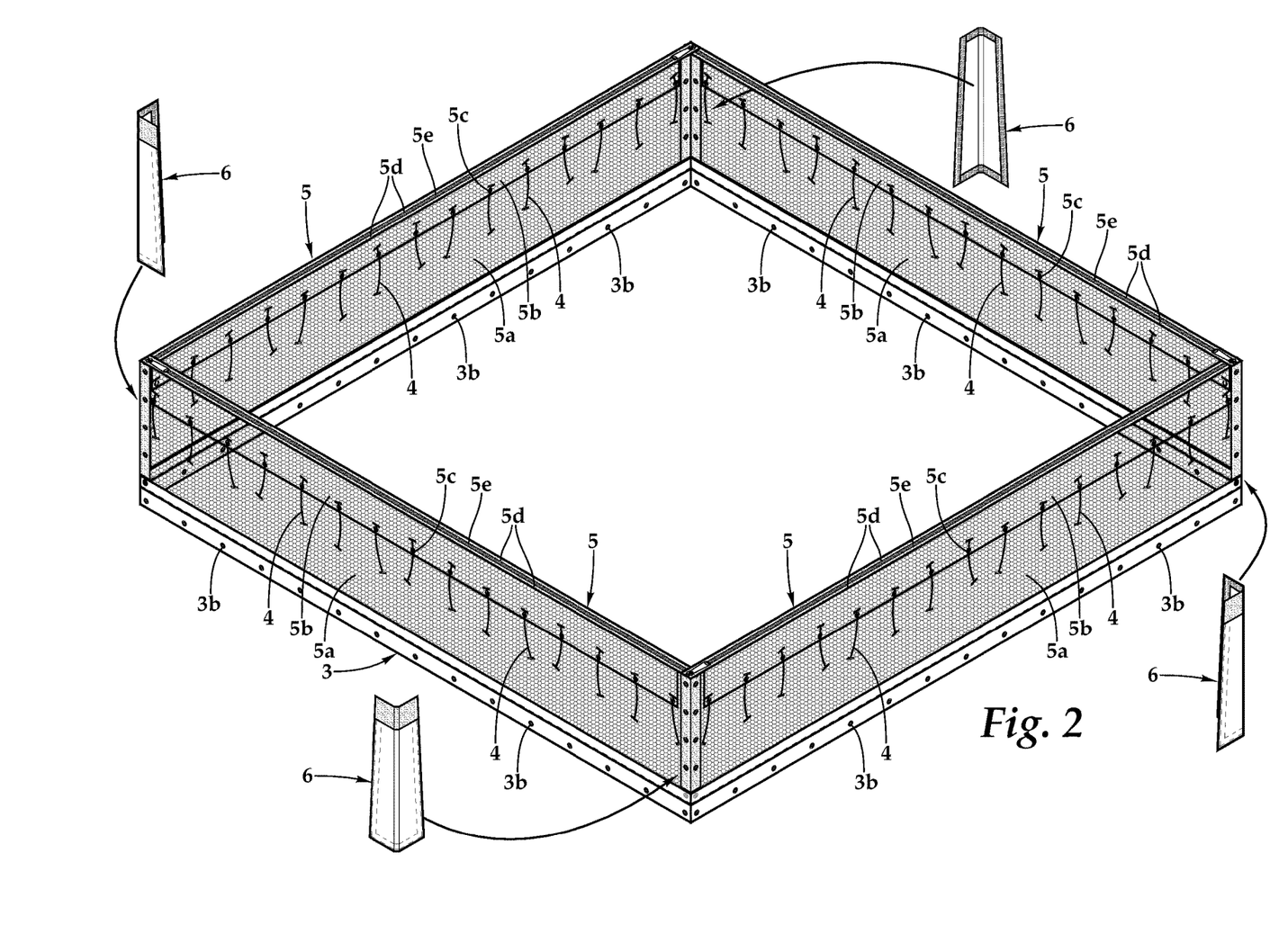
FIG. 2 is a perspective view of the apron, perimeter skirt, and corner pieces of the present invention.

FIG. 2 is a perspective view of the apron, perimeter skirt, and corner pieces of the present invention. The apron 3 is comprised of four strips of polyester fabric with PVC coating, sized to correspond to the length of each side of the foam pit. The bottom part of the apron is affixed to the wall of the foam pit with screws 6 and fender washers 7 (see FIG. 5). The bottom part of the apron 3a also comprises a plurality of grommets 3b. The grommets 3b are configured to receive the bottom ends of the toggle bungee cords 4. The top part of the apron 3c is attached to the perimeter skirt 5.

The perimeter skirt 5 is comprised of four sections, each of which is sized to correspond to the length of each side of the foam pit. The perimeter skirt 5 is preferably comprised of a breathable, woven polypropylene material that is loaded with carbon. An example of this material is PERMATRON® trampoline fabric manufactured and distributed by Nicolon Corporation of Pendergrass, Georgia Each section of perimeter skirt 5 comprises a primary sheet 5a, the bottom end of which is attached to the top part of the apron 3c, and a secondary sheet 5b. The top end of the secondary sheet 5b is attached to the top end of the primary sheet 5a, as shown more clearly in FIG. 5. The secondary sheet 5b comprises a plurality of grommets 5c, which are configured to receive the top ends of the toggle bungee cords 4. The bottom end of the secondary sheet 5b is free-hanging (not attached to anything). The corner pieces 6 are discussed more fully in connection with FIGS. 9-13.

Figure 3:
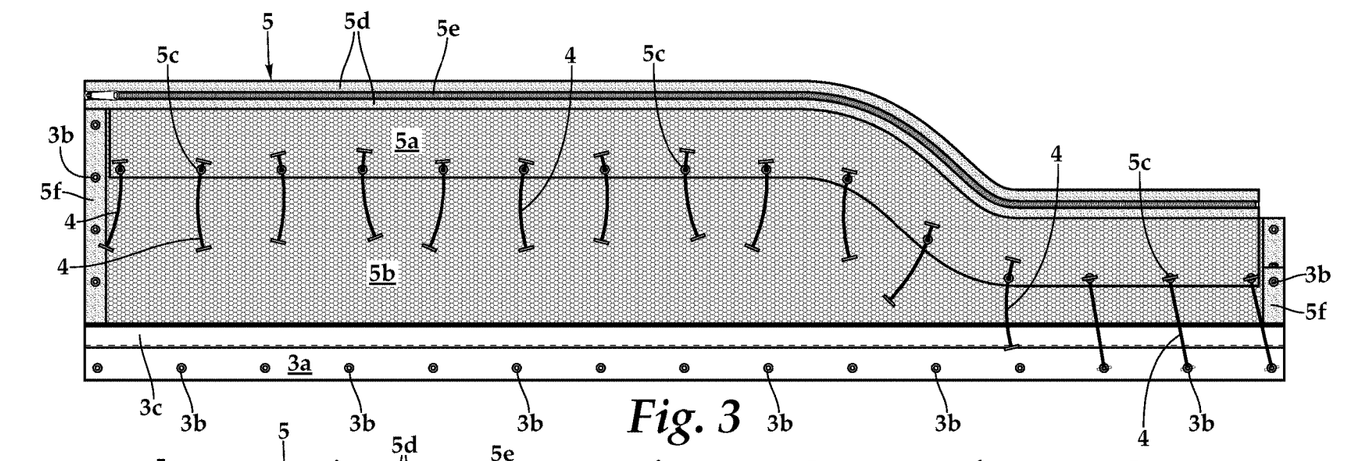
FIG. 3 is a side view of the apron and perimeter skirt of the present invention shown with some of the toggle bungee cords installed on the apron.
Figure 4:
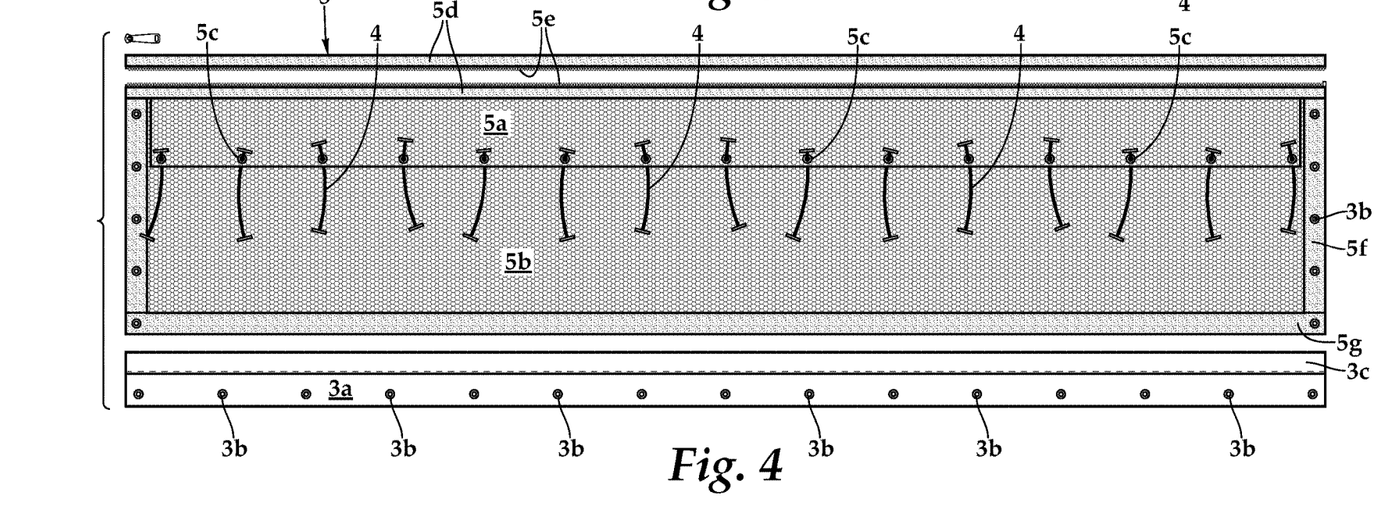
FIG. 4 is a side exploded view of the apron and perimeter skirt of the present invention.

FIG. 3 is a side view of the apron and perimeter skirt of the present invention shown with some of the toggle bungee cords installed on the apron, and FIG. 4 is a side exploded view of the apron and perimeter skirt of the present invention. As shown in these two figures, the top end of the primary sheet 5a of the perimeter skirt 5 preferably comprises a strip of loop fastener 5d and a zipper 5e situated in the middle of the strip of loop fastener 5d and extending the entire length of the loop fastener 5d. The two sides of each section of perimeter skirt 5 (more specifically, the primary sheet 5a) also preferably comprise a strip of loop fastener 5f for attachment to the corner pieces 6. In a preferred embodiment, the bottom end of the primary sheet 5a of the perimeter skirt 5 comprises a strip of loop fastener 5g that is configured to mate with a gator clip 3d on the top part 3c of the apron 3 (see FIG. 7). In an alternate embodiment (not illustrated in the figures), the bottom end of the primary sheet 5a of the perimeter skirt 5 is sewn to the top part 3c of the apron 3 rather than attached with a gator clip.

As illustrated in FIG. 3, when the bottom ends of the toggle bungee cords 4 are affixed to the grommets 3b in the apron 3 and the top ends of the toggle bungee cords 4 are affixed to the secondary sheet 5b, the top end of the primary sheet 5a is drawn toward the apron 3. The second sheet 5b is necessarily shorter than the primary sheet 5a, as shown. In a preferred embodiment, the height of the secondary sheet 5b (that is, the distance from the top end of the secondary sheet to the bottom end of the secondary sheet) is approximately one-sixth that of the primary sheet.

Figure 5:
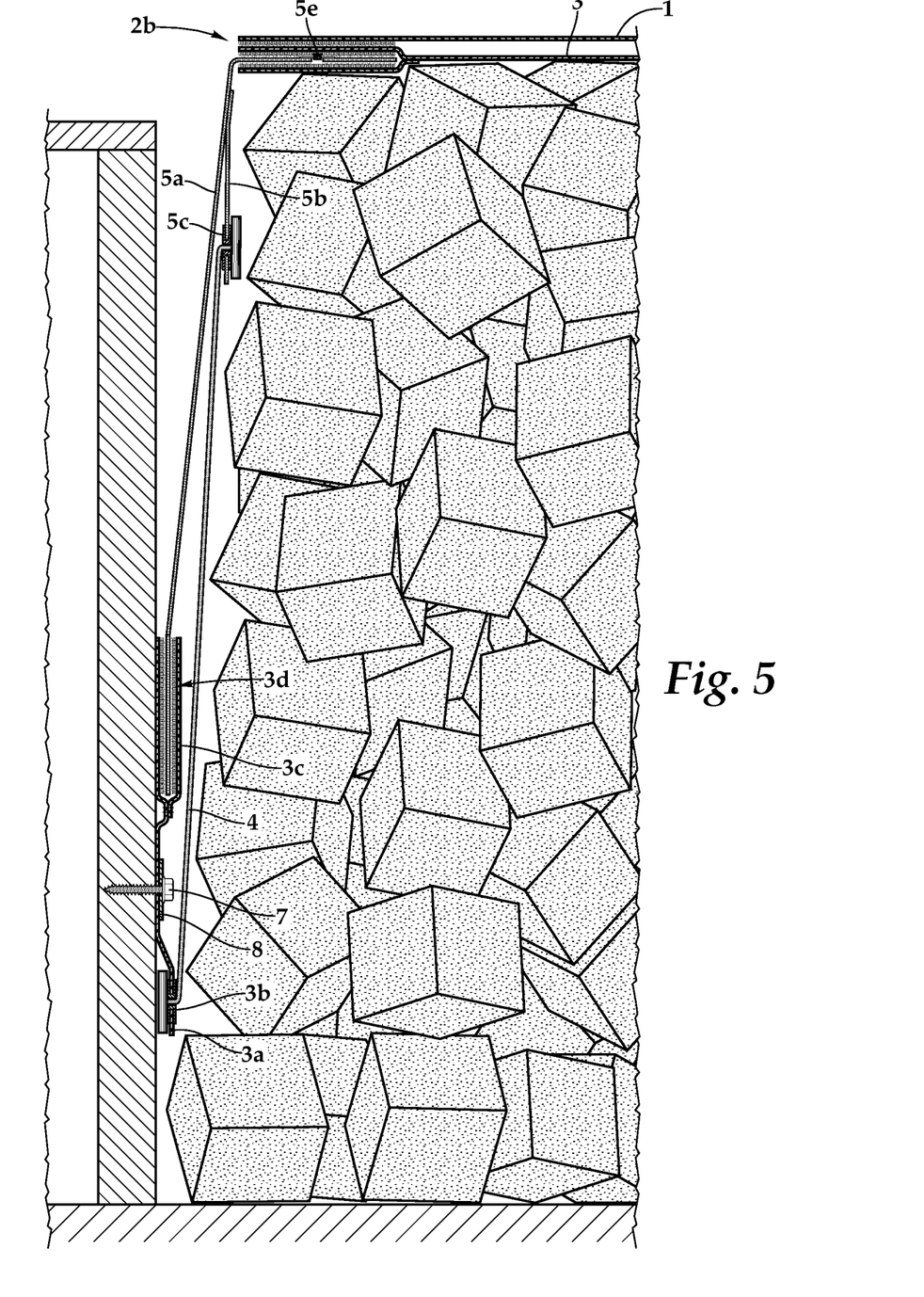
FIG. 5 is a side view of the present invention shown installed in a foam pit.
Figure 6:
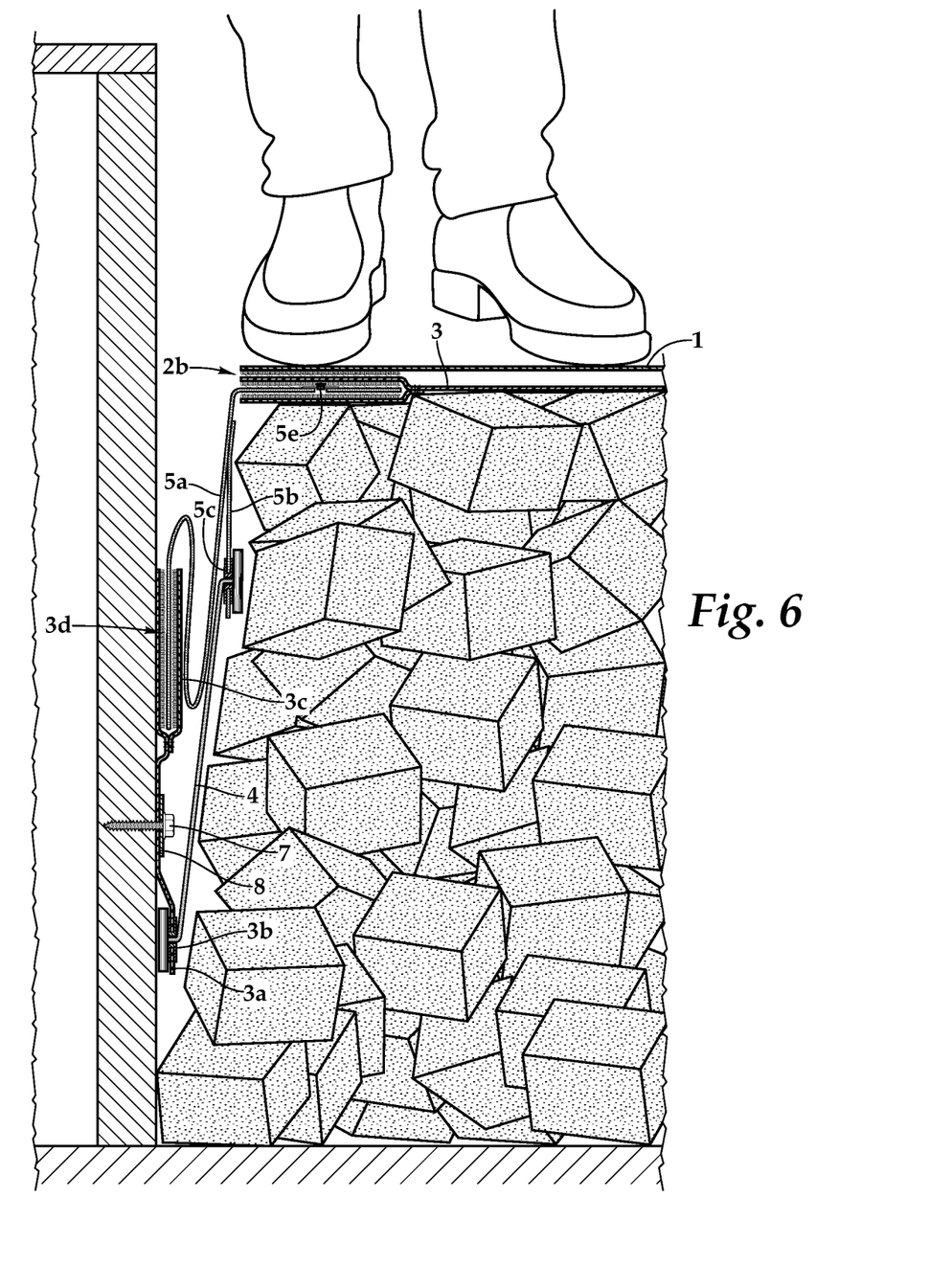
FIG. 6 is a side view of the present invention shown installed in a foam pit and with a person landing on the top sheet.

FIG. 5 is a side view of the present invention shown installed in a foam pit. As shown in this figure, in the normal resting state, the primary sheet 5a of the perimeter skirt 5 is (more or less) fully extended over the foam cubes. The toggle bungee cord 4 is being stretched (to some degree) by the force of the cover sheet 2 against the foam cubes. FIG. 6 is a side view of the present invention shown installed in a foam pit and with a person landing on the top sheet. In this figure, the foam cubes are compressed, the primary sheet 5a bunches up, and the toggle bungee cord 4 retracts. The gator clips 2b, 3d secure the cover sheet 2 and primary sheet 5a, respectively.

Figure 7:
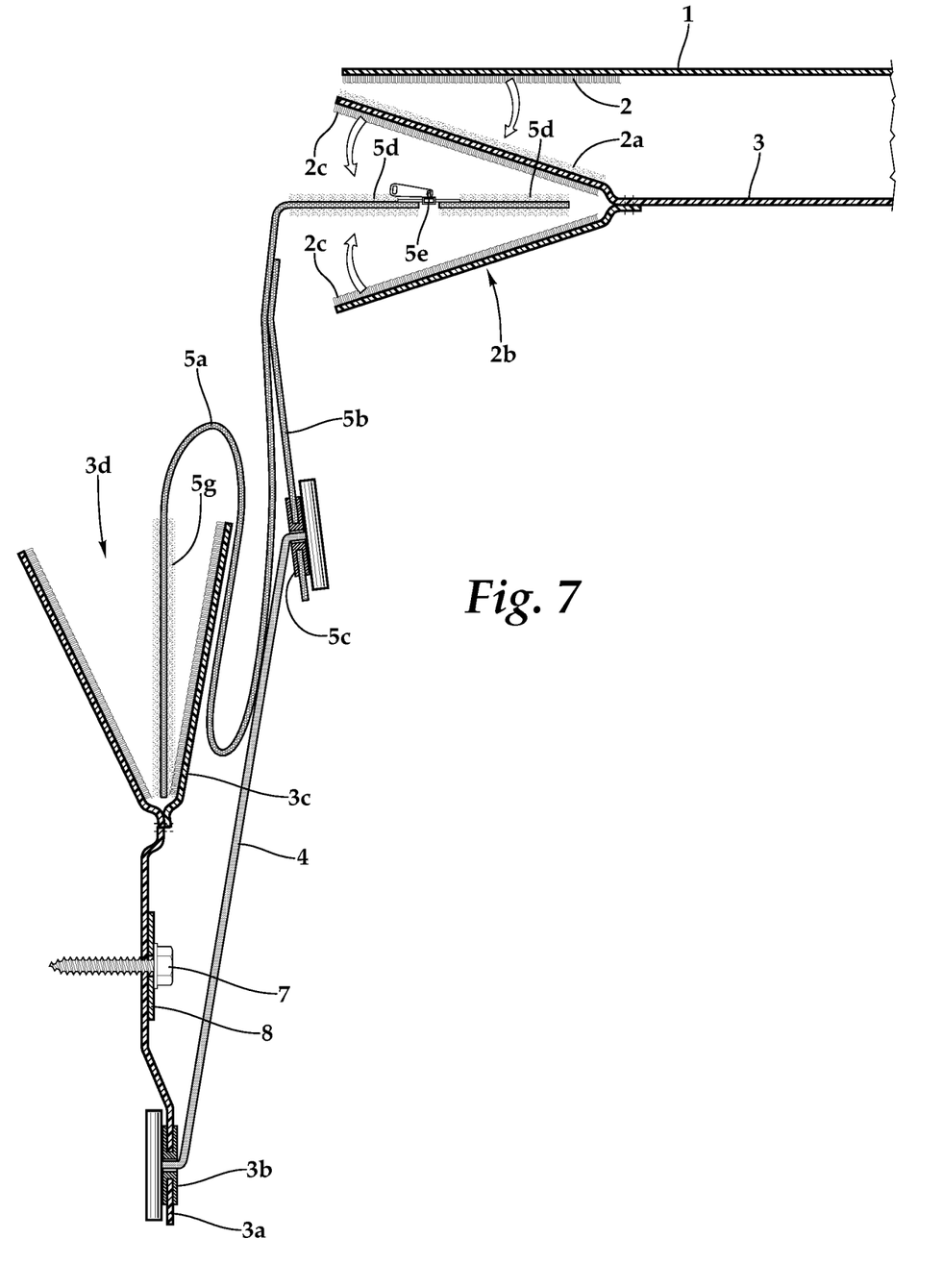
FIG. 7 is a schematic side view of the present invention shown with the two gator clips in an open position.

FIG. 7 is a schematic side view of the present invention shown with the two gator clips in an open position. The gator clips 2b, 3d would not be opened during normal operation but would only be opened during cleaning or to access the foam pit for other reasons (for example, to retrieve lost items). As noted above, the second gator clip 3d may be eliminated, in which case the primary sheet 5a would be sewn to the top part 3c of the apron 3.

Figure 8:
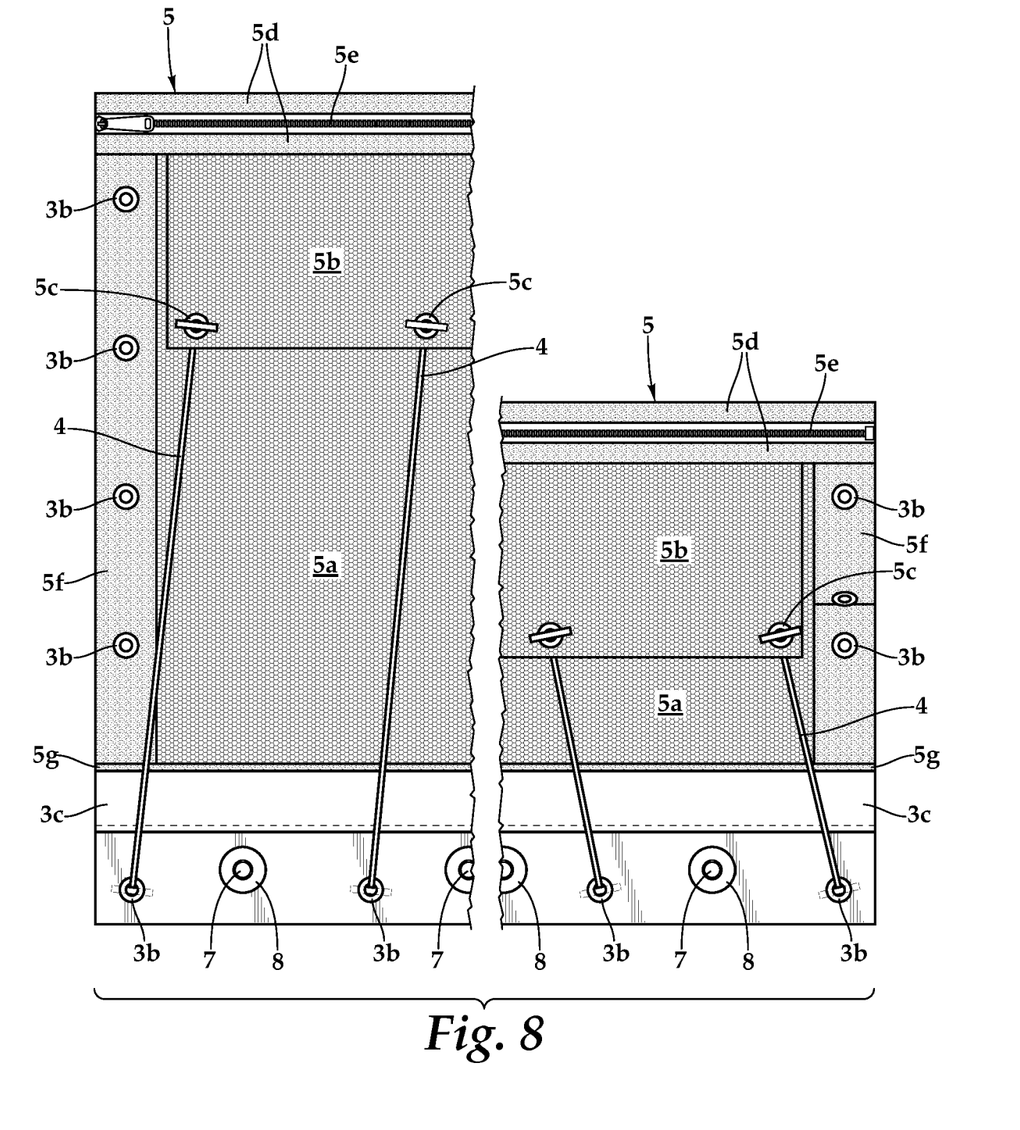
FIG. 8 is a detail view of the toggle bungees shown affixed to both the apron and the perimeter skirt with the invention in a non-compressed and a compressed position.

FIG. 8 is a detail view of the toggle bungees shown affixed to both the apron and the perimeter skirt with the invention in a non-compressed and a compressed position. In the left-hand side of this figure, the toggle bungee cords 4 are extended to allow the perimeter skirt 5 to stretch over the foam cubes (not shown); this part of the figure corresponds to FIG. 5. In the right-hand side of this figure, the toggle bungee cords 4 are retracted due to the placement of weight on the cover sheet 2 (not shown); this part of the figure corresponds to FIG. 6.

Figures 9, 10, 11, 12, 13:
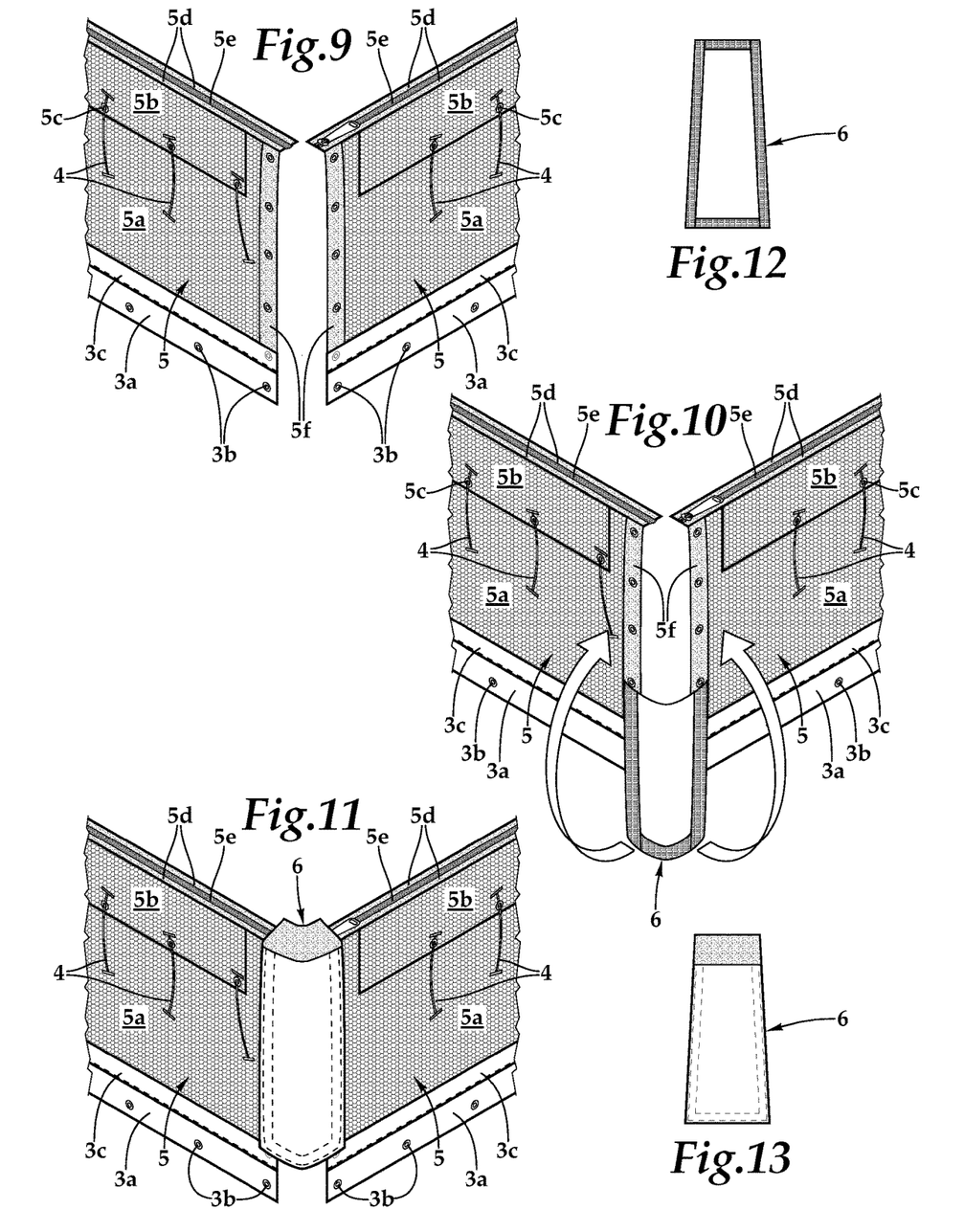
FIG. 9 is a detail perspective view of the corner area of the present invention shown without the corner piece installed.
FIG. 10 is a detail perspective view of the corner area of the present invention shown in relation to the corner piece and prior to installation of the corner piece.
FIG. 11 is a detail perspective view of the corner area of the present invention shown with the corner piece installed.
FIG. 12 is a front view of the corner piece of the present invention.
FIG. 13 is a rear view of the corner piece of the present invention.

FIGS. 9-11 illustrate the installation of the corner pieces. The corner pieces 6 are preferably comprised of polyester material with PVC coating and tapered so that the bottom of each corner piece is wider than the top. As shown in FIG. 2, the corner pieces 6 are affixed to the corner sections of the invention (where the sections of perimeter skirt 5 come together). In a preferred embodiment, the front surface of each corner piece 6 (see FIG. 12) comprises strips of hook fastener along the perimeter of the corner piece, and these strips of hook fastener mate with the vertically oriented strips of loop fastener along the sides of each section of perimeter skirt 5 (see FIG. 10). The top of the back surface of each corner piece 6 (see FIG. 13) preferably comprises a section of loop fastener, which is folded over the top of the top of the corner of the perimeter skirt 5, where the two sections of perimeter come together (see FIG. 11). In this manner, the corner pieces 6 completely secure the contents of the foam pit from the exterior environment.

The present invention is designed to fit any size of foam pit and allows the park owner/operator to display custom graphics on the top sheet. The invention allows patrons to enjoy a safer hygienic experience without the concerns of jumping into dirty foam pits, eliminating the potential for contact with sweaty foam cubes, bacteria, hair clumps and viruses. The present invention is designed to be easily installed by park operators without the need to incur any installation expenses. The unique features of the perimeter skirting and apron allows the invention to expand and contract with use, thereby reducing tension on the main cover. The invention also prevents the cover from bunching up and provides a deeper impact landing zone for safety.

A key advantage of the present invention is the fact that the perimeter skirt allows the foam pit to breathe, which prevents mold and bacteria build-up by allowing air to escape the cover/pit with each impact by a patron. Upon impact, the cover will remain flat and will not lift from trapped airflow. This makes it easier to spot lower levels of foam (which may need to be fluffed for safety) throughout the pit.

The present invention incorporates industrial zipper access on all four sides of the cover. This feature allows easy access to the foam pit for operators to fluff the foam frequently. It also facilitates cleaning of the foam cubes. The zipper is also preferably enclosed with a gator clip to prevent customers from unzipping the cover.

Another advantage of the present invention is that it prevents dust and foam particles from becoming airborne and getting into patrons' eyes and face, which is a problem with existing foam pits.

The present invention will decrease payroll expenses because cleaning requirements are reduced. It also reduces down time incurred when the foam pit is closed down as a result of items (such as cell phones) being lost in the foam pit. The present invention eliminates this problem by preventing any object from falling underneath the cover or into the foam cubes.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention. As used in the claims, the term "hook-and-loop fastener" may mean either the hook part or the loop part of a hook-and-loop fastener.

We claim:
1. A foam pit cover comprising:
(a) a cover sheet having a perimeter, the cover sheet comprising a gator clip along the perimeter of the cover sheet, the gator clip comprising two opposing strips of hook-and-loop fastener being joined at a hinge to form a jaw-like opening;
(b) a perimeter skirt, the perimeter skirt comprising a primary sheet and a secondary sheet;
   wherein the primary sheet and the secondary sheet are both comprised of a breathable, durable material;
   wherein a top edge of the primary sheet is joined to a top edge of the secondary sheet;
   wherein a bottom edge of the primary sheet comprises a strip of hook-and-loop fastener along a perimeter of the bottom edge of the primary sheet;
   wherein a bottom part of the secondary sheet comprises a first plurality of grommets configured to receive first ends of a plurality of toggle bungee cords;
   wherein the primary sheet has a height measured from the top edge of the primary sheet to the bottom edge of the primary sheet, the secondary sheet has a height measured from the top edge of the secondary sheet to a bottom edge of the secondary sheet, and wherein the height of the primary sheet is greater than the height of the secondary sheet; and
   wherein a top part of the perimeter skirt comprises a strip of hook-and-loop fastener with a zipper disposed within the strip of hook-and-loop fastener;
(c) an apron having a top part and a bottom part, the top part of the apron comprising a gator clip, the gator clip comprising two opposing strips of hook-and-loop fastener being joined at a hinge to form a jaw-like opening and configured to receive the strip of hook-and-loop fastener along the perimeter of the bottom edge of the primary sheet of the perimeter skirt;
   wherein the bottom part of the apron comprises a second plurality of grommet holes configured to receive second ends of the plurality of toggle bungee cords; and
(d) a plurality of toggle bungee cords.

2. The foam pit cover of claim 1, further comprising a top sheet having a perimeter, the perimeter of the top sheet comprising a strip of hook-and-loop fastener along an underside of the perimeter of the top sheet;
   wherein the cover sheet further comprises a strip of hook-and-loop fastener along a top side of the gator clip on the perimeter of the cover sheet; and
   wherein the top sheet and cover sheet are of equal size.

3. The foam pit cover of claim 1, wherein the cover sheet and the apron are comprised of polyester fabric with a polyvinyl chloride coating.

4. The foam pit cover of claim 1, wherein the primary sheet and the secondary sheet of the perimeter skirt are comprised of a woven polypropylene material that is loaded with carbon.

5. The roam pit cover of claim 1, further comprising one or more corner pieces, each corner piece being tapered so that a bottom end of the corner piece is larger than a top end of the corner piece;
   wherein each corner piece comprises a perimeter;
   wherein each corner piece comprises a strip of hook-and-loop fastener along a front surface of the perimeter of the corner piece; and
   wherein each corner piece comprises a section of hook-and-loop fastener on a top part of a rear surface of the coiner piece.

6. The foam pit cover of claim 1, further comprising a plurality of screws and fender washers for attachment of the bottom part of the apron to a wall of a foam pit.

7. A foam pit cover comprising:
(a) a cover sheet having a perimeter, the cover sheet comprising a gator clip along the perimeter of the cover sheet, the gator clip comprising two opposing strips of hook-and-loop fastener being joined at a hinge to form a jaw-like opening;
(b) a perimeter skirt, the perimeter skirt comprising a primary sheet and a secondary sheet;
   wherein the primary sheet and the secondary sheet are both comprised of a breathable, durable material;
   wherein a top edge of the primary sheet is joined to a top edge of the secondary sheet;
   wherein a bottom part of the secondary sheet comprises a first plurality of grommets configured to receive first ends of a plurality of toggle bungee cords;
   wherein the primary sheet has a height measured from the top edge of the primary sheet to the bottom edge of the primary sheet, the secondary sheet has a height measured from the top edge of the secondary sheet to a bottom edge of the secondary sheet, and wherein the height of the primary sheet is greater than the height of the secondary sheet; and
   wherein a top part of the perimeter skirt comprises a strip of hook-and-loop fastener with a zipper disposed within the strip of hook-and-loop fastener;
(c) an apron having a top part and a bottom part;
   wherein a bottom edge of the primary sheet of the perimeter skirt is sewn to the top part of the apron;
   wherein the bottom part of the apron comprises a second plurality of grommet holes configured to receive second ends of the plurality of toggle bungee cords; and
(d) a plurality of toggle bungee cords.

* * * * *